(12) United States Patent
Binboga et al.

(10) Patent No.: US 11,276,365 B2
(45) Date of Patent: Mar. 15, 2022

(54) WIRELESS COMMUNICATION SYSTEM AND DISPLAY INTEGRATION

(71) Applicant: Intel Corporation, Santa Clara, CA (US)

(72) Inventors: Evrim Binboga, Pleasanton, CA (US); Vivek Paranjape, Portland, OR (US); Vishal Ravindra Sinha, Portland, OR (US); Kunjal S. Parikh, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/729,359

(22) Filed: Dec. 28, 2019

(65) Prior Publication Data

US 2020/0135140 A1  Apr. 30, 2020

(51) Int. Cl.
| | |
|---|---|
| *G06F 3/046* | (2006.01) |
| *G09G 3/30* | (2006.01) |
| *G09G 3/36* | (2006.01) |
| *G09G 5/00* | (2006.01) |
| *G06F 3/147* | (2006.01) |

(52) U.S. Cl.
CPC .............. *G09G 5/006* (2013.01); *G06F 3/147* (2013.01); *G09G 2370/10* (2013.01); *G09G 2370/16* (2013.01)

(58) Field of Classification Search
CPC . G09G 2330/021–028; G09G 2370/16; G09G 2300/02–026; G09G 2300/0404; G09G 2300/4008; G09G 2300/0804; G09G 3/3644; G09G 2360/04–06; G09G 2360/122; G06F 3/046
See application file for complete search history.

(56) References Cited

U.S. PATENT DOCUMENTS

| | | |
|---|---|---|
| 2013/0328723 A1 | 12/2013 | Rappaport |
| 2016/0343771 A1 | 11/2016 | Bower et al. |
| 2017/0005707 A1 | 1/2017 | Islam et al. |
| 2017/0356980 A1 | 12/2017 | Islam et al. |
| 2018/0033835 A1* | 2/2018 | Zeng ................. G06K 9/00013 |
| 2018/0093177 A1* | 4/2018 | Tokubo ................ A63F 13/211 |
| 2019/0131345 A1 | 5/2019 | Ahmed et al. |
| 2019/0221155 A1 | 7/2019 | Parikh et al. |
| 2019/0251378 A1* | 8/2019 | Jung .................... A61B 5/1172 |
| 2019/0335553 A1 | 10/2019 | Ahmed et al. |
| 2020/0153469 A1* | 5/2020 | Park ..................... G09G 3/2092 |
| 2020/0241671 A1* | 7/2020 | Cheng ................. G06F 3/0412 |
| 2020/0265785 A1* | 8/2020 | Kim ....................... H01L 27/124 |

OTHER PUBLICATIONS

EPO European Extended Search Report in EP Application Serial No. 20194487.3-1205 dated Feb. 24, 2021.
U.S. Appl. No. 16/729,353 entitled Haptics and Microphone Display Integration filed on Dec. 28, 2019 (61 pages).

* cited by examiner

*Primary Examiner* — Sanghyuk Park
(74) *Attorney, Agent, or Firm* — Alliance IP, LLC

(57) ABSTRACT

A display comprising a display substrate comprising a front side; a plurality of pixels located on the front side of the display substrate, the plurality of pixels defining a display area; and an antenna array comprising a plurality of antennas located on the front side of the display substrate and within the display area.

20 Claims, 9 Drawing Sheets

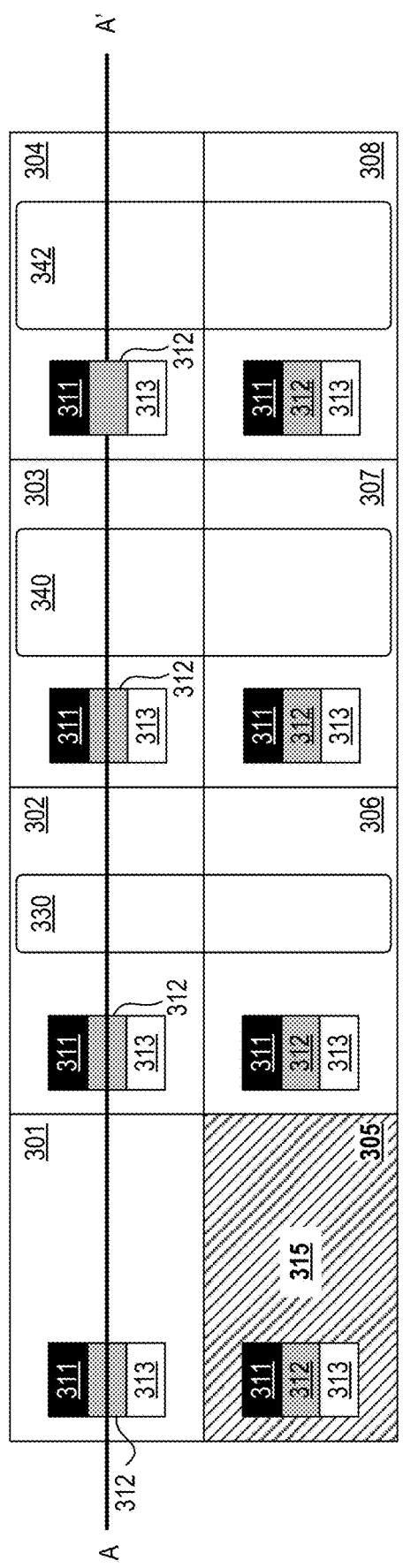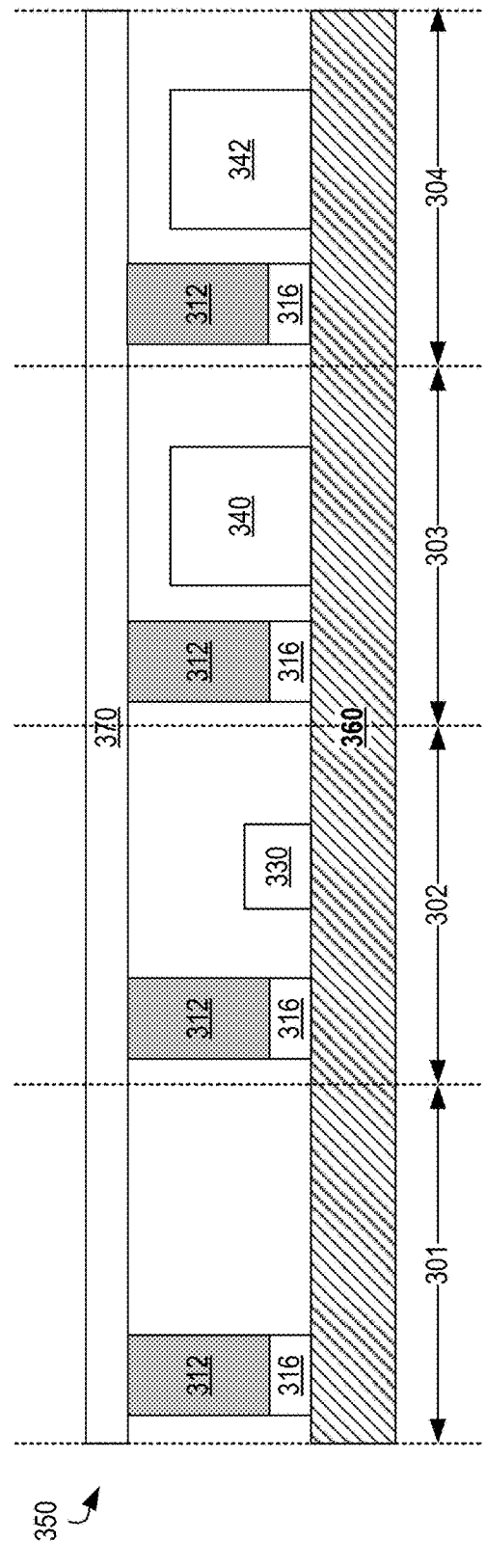
FIG. 3A
FIG. 3B

WIRELESS COMMUNICATION SYSTEM AND DISPLAY INTEGRATION

BACKGROUND

Modern computing devices typically include a display and one or more antennas to enable wireless communication. Laptops, notebooks, and mobile devices with similar form factors may typically have one or a small number of antennas located in the bezel of the display housing.

BRIEF DESCRIPTION OF THE DRAWINGS

FIG. 3A illustrates a set of exemplary pixels with integrated wireless communication system components in accordance with certain embodiments.

FIG. 3B illustrates a cross-section of the exemplary pixels of FIG. 4A taken along the line A-A' in accordance with certain embodiments.

DETAILED DESCRIPTION

Computing systems may include multiple antennas arranged in various locations on the computing system to realize a desired throughput. In some instances, these antennas are placed outside of the display surface, but such antennas may take up quite a bit of space and volume around the display surface, thus causing a designer to face a tradeoff between antenna performance and design aesthetics (e.g., form factor thickness or form factor bezel size).

A computing system may also include other components (e.g., a Wi-Fi module, memory, and a processor on a system-on-chip (SoC) coupled to the display) that perform media playback functions, such as streaming, decoding, and processing media communicated wirelessly to the computing system. Such components may be high performance components or other components that are not optimized for media playback and may use excessive power when performing media playback functions. Some existing systems utilize casting media playback solutions (e.g., GOOGLE CHROMECAST™) to offload media playback operations from the SoC to a media dongle, however, such a model requires development of an ecosystem of applications that are compatible with the casting solution.

Figure 1:
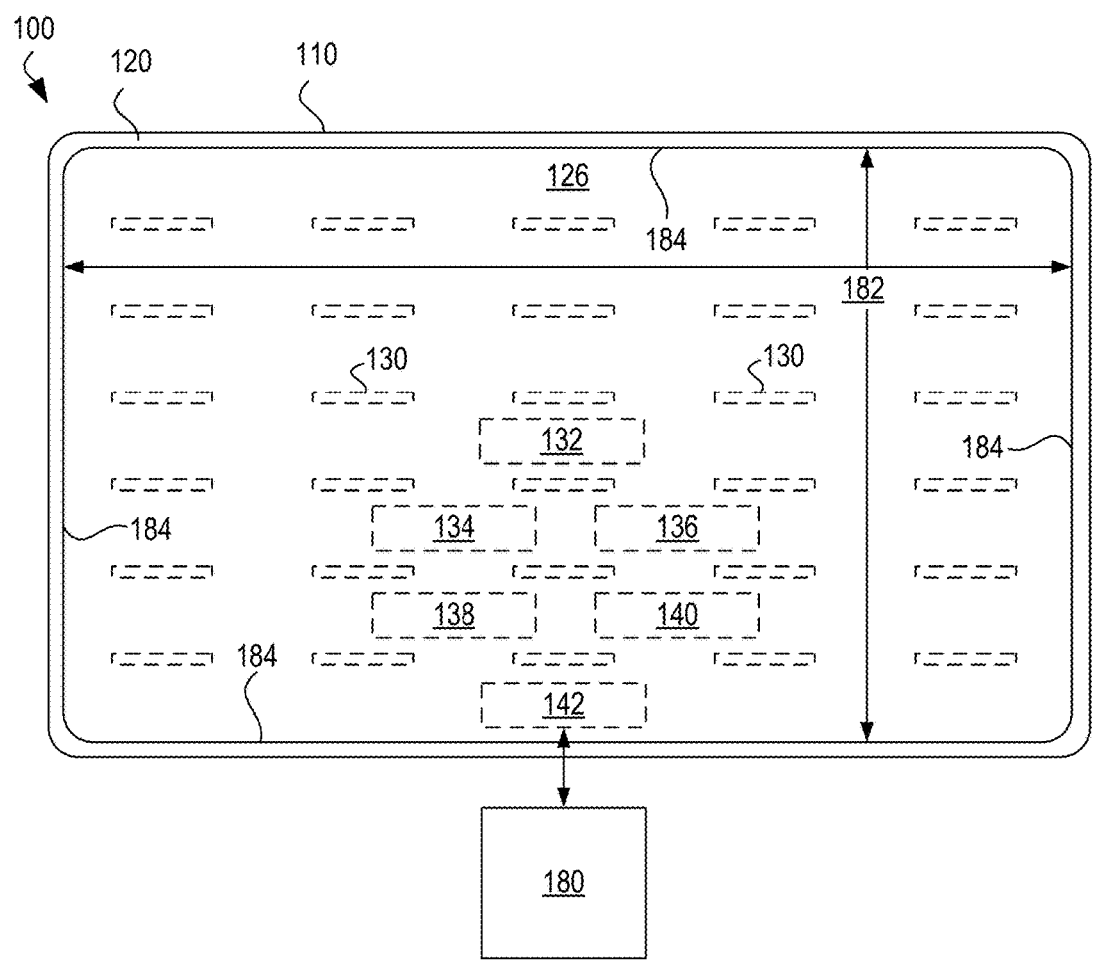
FIG. 1 illustrates a display in accordance with certain embodiments.

FIG. 1 illustrates a display 100 in accordance with certain embodiments. The display 100 comprises a housing 110, a bezel 120, and a display surface 126. The size of the display elements responsible for generating light in a display pixel or allowing for the transmission of light through each pixel continues to shrink over time. Even at higher resolutions used in existing consumer electronics displays (e.g., 1920× 1080 (Full HD), 3840×2160 (4K HD)), the display elements may take up only a portion of the area of a pixel. If the black matrix area of a display (the area of the front side of the display substrate not occupied by display elements) has enough unused space, additional elements, such as antennas or other communication system components, can be incorporated into individual pixels. Moving antennas from the display bezel to the display area may enable a reduced bezel width and allow for many antennas to be incorporated into a display.

Micro-displays result in significant per-pixel available real estate, dependent on the size of the display elements and the overall resolution of the display. Just as display elements may be deposited onto a display backplane through a variety of micro-transfer processes, a number of antennas may be deposited onto the pixels to create an antenna array within the display. Similarly, other wireless communication or media playback components may be integrated into the display to enable offloading of media playback from a processor (e.g., in the SoC 180) to the display.

The integration of wireless communication and/or media playback components into the display may provide one or more of various advantages. In various embodiments, the media playback power consumption may be reduced significantly compared to media playback performed by an SoC coupled to the display, the throughput of the system may be improved, system radio frequency (RF) interference may be reduced, specific absorption rate (SAR) may be reduced, thinner bezel designs may be enabled, and/or cost may be reduced (e.g., by omission of multiple discrete system antennas and cables).

Display 100 can be any type of display in which the display elements responsible for generating light or allowing for the transmission of light are located at each pixel. Such displays include, e.g., TFT LCD (thin-film-transistor liquid crystal display), micro-LED (micro-light emitting diode), OLED (organic LED), and QLED (quantum dot LED) displays. The housing 110 of the display 100 comprises the bezel 120, which borders the display surface 126. Display 100 comprises a display substrate (not shown in FIG. 1) on which a plurality of pixels (also not shown) are located. The pixels define a display area 182 within which images, videos, and other content can be displayed. In display 100, the pixels extend to interior edges 184 of the bezel 120. The display area 182 thus extends from one interior bezel edge 184 to the opposite bezel edge 184 in both the horizontal and vertical directions.

Display 100 includes various communication system and media playback components within the display area 182. In the embodiment depicted, display 100 includes an antenna array comprising a plurality of antennas 130, radio circuitry 132, wireless communication controller 134, memory 136, media processing components 138, display driver 140, and interface 142. Each of these components may be described in more detail herein (e.g., in connection with FIG. 6).

The interface 142 is electrically coupled to a chip 180 (e.g., an SoC) that is external to the display. The chip 180 may comprise one or more processors. The display 100 is shown as a stand-alone display and as such the interface 142 may be in wired or wireless communication with one or more central processor units (CPUs), graphic processing units (GPUs), or systems-on-a-chip (SOCs) located in a laptop, tablet, smart phone, desktop, workstation or other computing device. In other embodiments, the display 100 is integrated into a mobile device such as a smartphone, tablet, watch, mobile gaming system, AR/VR headset, laptop computer, etc. and the interface 142 is in communication with one or more processors incorporated within the mobile device. In still other embodiments, the display 100 can be an embedded display such as in an in-vehicle infotainment (IVI) system, a kiosk, or in any other of a wide variety of consumer or commercial electronic devices, such as television sets, commercial display installations (trade shows, stadiums, shopping malls, etc.), and navigation systems.

Figure 2A:
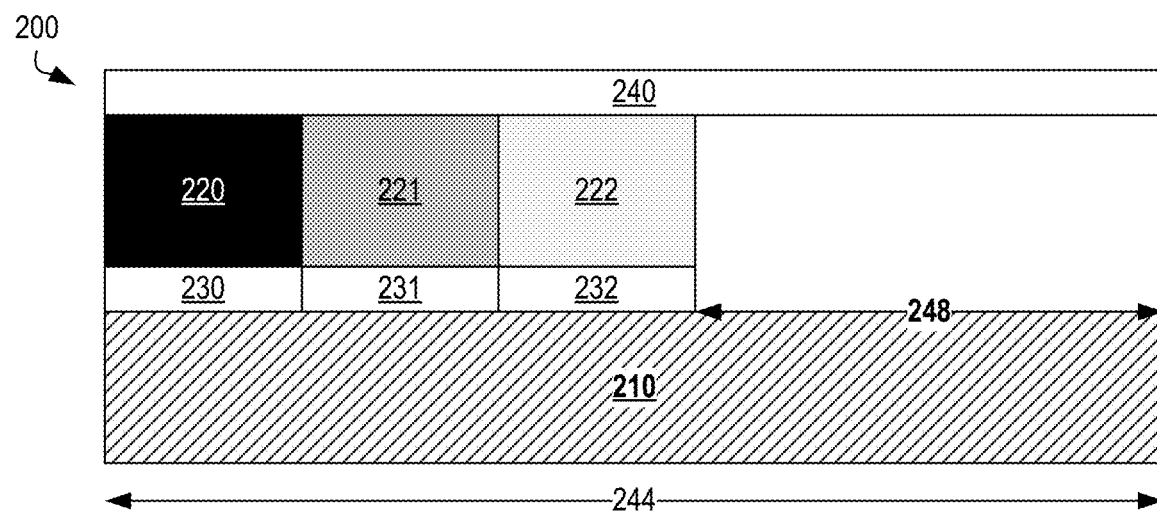
FIGS. 2A-2B illustrate simplified cross-sections of pixels in displays in accordance with certain embodiments.
Figure 2B:
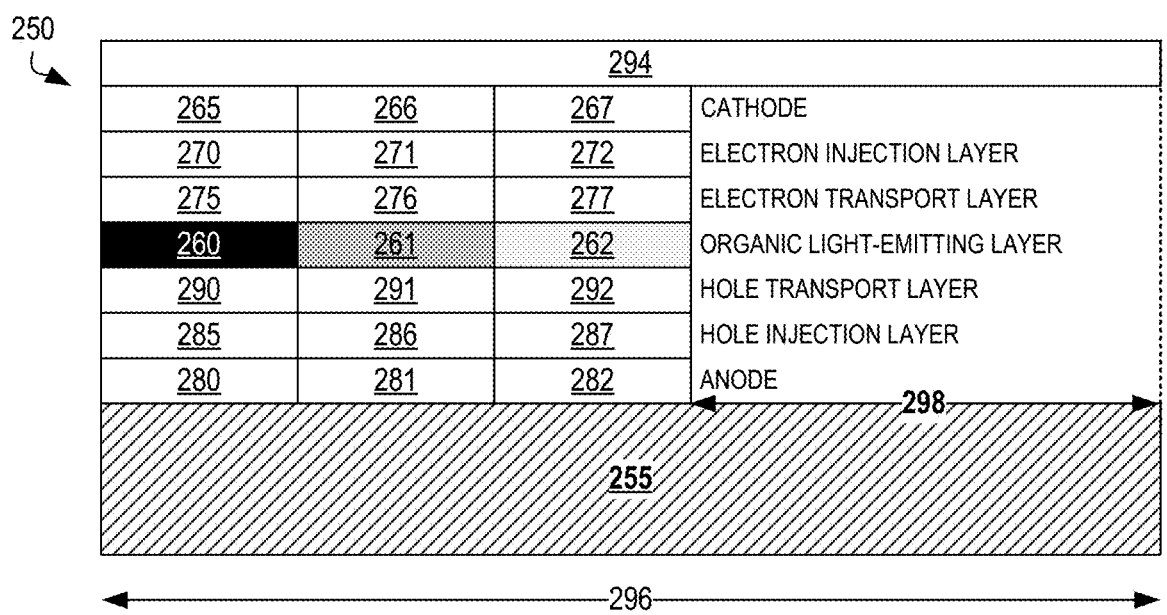

FIGS. 2A-2B illustrate simplified cross-sections of pixels in displays in accordance with certain embodiments. A pixel may be a minute area of illumination on a display screen, one of many from which an image is composed. In other words, pixels may be small discrete elements that together constitute an image as on a display. These primarily square or rectangular-shaped units may be the smallest item of information in an image. Pixels are normally arranged in a two-dimensional (2D) matrix, and are represented using dots, squares, rectangles, or other shapes. Pixels may be the basic building blocks of a display or digital image and with geometric coordinates.

FIG. 2A is a simplified illustration of the cross-section of a pixel in a micro-LED display. A micro-LED display may utilize a type of emissive display technology that uses a matrix of individually-switched self-illuminating inorganic diodes that can be controlled and lit without a master backlight. Conventional LEDs are typically of a size on the order of hundreds of microns. In contrast, micro-LEDs may have, e.g., a size on the order of tens of microns or less. Micro-LED pixel 200 comprises a display substrate 210, a red LED 220, a green LED 221, a blue LED 222, electrodes 230-232, and a transparent display medium 240. The LEDs 220-222 are the individual light-producing elements for the pixel 200, with the amount of light produced by each LED 220-222 being controlled by the associated electrode 230-232.

The LED stacks (red LED stack (layers 220 and 230), green LED stack (layers 221 and 231) and blue LED stack (layers 222 and 232)) can be manufactured on a substrate using microelectronic manufacturing technologies. The display substrates described herein may comprise any suitable materials. For example, the substrate may be a glass substrate, a silicon substrate, or other suitable substrate. In some embodiments, the display substrate 210 is a substrate different from the substrate upon which the LEDs stacks are manufactured and the LED stacks are transferred from the manufacturing substrate to the display substrate 210. In other embodiments, the LED stacks are grown directly on the display substrate 210. In both embodiments, multiple pixels can be located on a single display substrate. In some embodiments, display manufacture comprises manufacturing individual display substrate portions to which pixels are attached and assembling the display substrate portions together to achieve a desired display size. In various embodiments, the interconnections connecting the various components to each other (e.g., the antennas 130 to the radio circuitry 132 or other connections described or illustrated herein) can be fabricated on or as part of the display substrate, attached to the display substrate, or physically coupled to the display substrate in any other manner.

The pixel 200 has a pixel width 244, which can depend on, for example, display resolution and display size. For example, for a given display resolution, the pixel width 244 can increase with display size. For a given display size, the pixel width 244 can decrease with increased resolution. The pixel 200 has an unused pixel area 248, which is part of the black matrix area of a display. In some displays, the combination of LED size, display size, and display resolution can be such that the unused pixel area 248 can be large enough to accommodate the integration of components, such as antennas or other wireless communication components or media playback components, within the pixels.

FIG. 2B is a simplified illustration of the cross-section of a pixel in an exemplary OLED display. OLED pixel 250 comprises a display substrate 255, organic light-emitting layers 260-262, which are capable of producing red (layer 260), green (layer 261) and blue (layer 262) light, respectively. The OLED pixel 250 further comprises cathode layers 265-267, electron injection layers 270-272, electron transport layers 275-277, anode layers 280-282, hole injections layers 285-287, hole transport layers 290-292, and a transparent display medium 294. The OLED pixel 250 generates light through application of a voltage across the cathode layers 265-267 and anode layers 280-282, which results in the injection of electrons and holes into electron injection layers 270-272 and hole injection layers 284-286, respectively. The injected electrons and holes traverse the electron transport layers 275-277 and hole transport layers 290-292, respectively, and electron-hole pairs recombine in the organic light-emitting layers 260-262 to generate light.

Similar to the LED stacks in micro-LED displays, OLED stacks (red OLED stack (layers 265, 270, 275, 260, 290, 285, 280), green OLED stack (layers 266, 271, 276, 261, 291, 286, 281), and blue OLED stack (layers 267, 272, 277, 262, 292, 286, 282), can be manufactured on a substrate separate from the display substrate 255. In some embodiments, the display substrate 255 is a substrate different from the substrate upon which the OLED stacks are transferred from the manufacturing substrate to the display substrate 255. In other embodiments, the OLED stacks are directly grown on the display substrate 255. In both types of embodiments, multiple display substrate components may need to be assembled in order to achieve a desired display size. The transparent display mediums 240 and 294 can be any transparent medium such as glass, plastic, or a film. In some embodiments, the transparent display medium can comprise a touchscreen.

Again, similar to the micro-LED pixel 200, the OLED pixel 250 has a pixel width 296 that can depend on factors such as display resolution and display size. The OLED pixel 250 has an unused pixel area 298 and in some displays, the combination of OLED stack widths, display size, and display resolution can be such that the unused pixel area 298 is large enough to accommodate the integration of components, such as antennas or other wireless communication components or media playback components, within the pixels.

As used herein, the term "display substrate" can refer to any substrate used in a display and upon which pixel display elements are manufactured or placed. For example, the display substrate can be a backplane manufactured separately from the pixel display elements (e.g., micro-LED/OLEDs in pixels 200 and 250) and upon which pixel display elements are attached, or a substrate upon which pixel display elements are manufactured.

FIG. 3A illustrates a set of exemplary pixels with integrated wireless communication system components in accordance with certain embodiments. Pixels 301-308 each have a red display element 311, green display element 312, and blue display element 313, which can be, for example, micro-LEDs or OLEDs. In other embodiments, the pixels may have other display elements (e.g., a yellow display element). Each of the pixels 301-308 occupy a pixel area. For example, the pixel 305 occupies pixel area 315. The amount of pixel area occupied by the display elements 311-313 in each pixel leaves enough remaining black matrix space for the inclusion of wireless communication or media playback components.

In various embodiments, a component may be located in the unused space of one or more pixels. For example, pixels 302 and 306 contain an antenna 330 (which may have any one or more characteristics of antennas 130) located alongside the display elements 311-313 (and between display elements of adjacent pixels such as 302 and 303 or 206 and 307. As another example, pixels 303 and 307 include component 340 and pixels 304 and 308 include component 342. For example, component 340 or 342 may include all or a portion of radio circuitry 132, wireless communication controller 134, memory 136, media processing components 138, display driver 140, interface 142, or other suitable wireless communication or media playback component. In one example, component 340 and 342 may be portions of the same wireless communication or media playback component. Thus, any one of radio circuitry 132, wireless communication controller 134, memory 136, video processing components 138, display driver 140, or interface 142 may include multiple discrete sections (each located in one or multiple adjacent pixels) that are communicatively coupled together.

In alternative embodiments, one or more of radio circuitry 132, wireless communication controller 134, memory 136, video processing components 138, display driver 140, or interface 142 (or portions thereof) may be located on the back side of the display substrate, and thus would not be constrained by unused pixel area or display element size and could be placed anywhere on the back side of a display substrate. A component may straddle any number of pixels. In yet other embodiments, one or more of radio circuitry 132, wireless communication controller 134, memory 136, video processing components 138, display driver 140, or interface 142 (or portions thereof) may be located on the display but outside of the display area 182 or entirely off of the display (e.g., in a chip coupled to the display).

FIG. 3B illustrates a cross-section of the exemplary pixels of FIG. 3A taken along the line A-A' in accordance with certain embodiments. Cross-section 350 illustrates the cross-section of pixels 301-304. Red display elements 312 and corresponding electrodes 316 for the pixels 301-304 are located on display substrate 360. The pixels 301-304 are covered by transparent display medium 370.

In some embodiments, the antennas or other components used in the technologies described herein can be discrete antennas or components that are manufactured or fabricated independently from the pixel display elements and are transferred from a manufacturing substrate or otherwise attached to a display substrate. In other embodiments, the antennas or other components can be fabricated directly on the display substrate. Although the antenna 330 and other components 340, 342 are shown as being located on the surface of the display substrate 360 in FIG. 3B, in embodiments where the antennas 330 or other components 340, 342 are fabricated on a display substrate, they can reside at least partially within the display substrate or on the substrate with one of more intervening layers between the substrate and the components.

As used herein, the term "located on" in reference to any components with respect to the display substrate refers to components that are physically coupled to the display substrate in any manner (e.g., discrete components that are directly attached to the substrate, discrete components that are attached to the substrate via one or more intervening layers, components that have been fabricated on the display substrate). As used herein, the term "located on" in reference to LEDs with respect to the display substrate similarly refers to LEDs that are physically coupled to the display substrate in any manner (e.g., discrete LEDs that are directly attached to the substrate, discrete LEDs that are attached to the substrate via one or more intervening layers, LEDs that have been fabricated on the display substrate).

FIGS. 4A-4D illustrate example antenna activation configurations in accordance with certain embodiments. Each configuration depicts an array of antennas 130 integrated on a display 400 (which may have any of the characteristics of display 100). In various embodiments, the array of antennas 130 may be configurable such that different pluralities of antennas 130 are activated in different configurations (e.g., based on desired operational characteristics). In FIGS. 4A-4D, the antennas that are activated are depicted in black while the deactivated antennas are depicted in white.

Figure 4A:
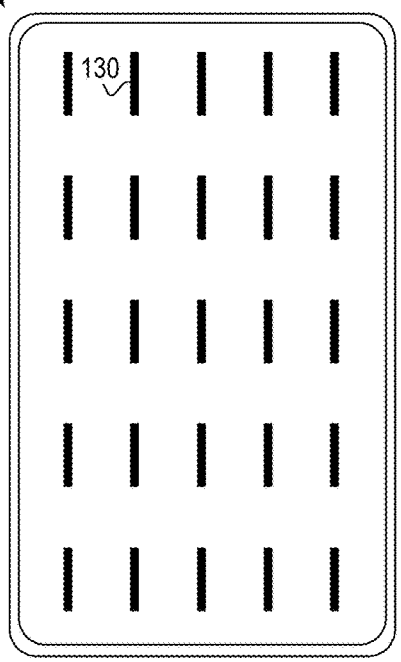
FIGS. 4A-4D illustrate example antenna activation configurations in accordance with certain embodiments.
Figure 4B:
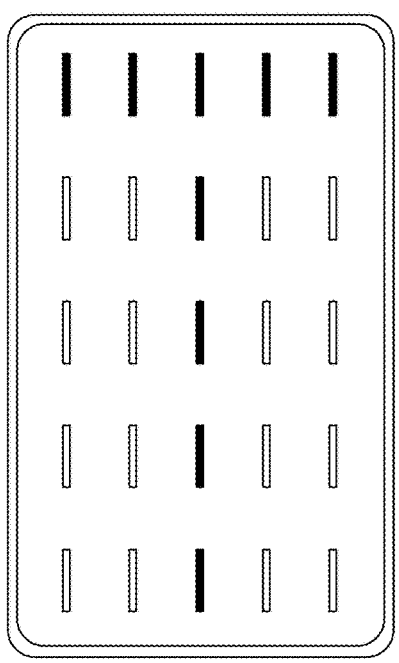
Figure 4C:
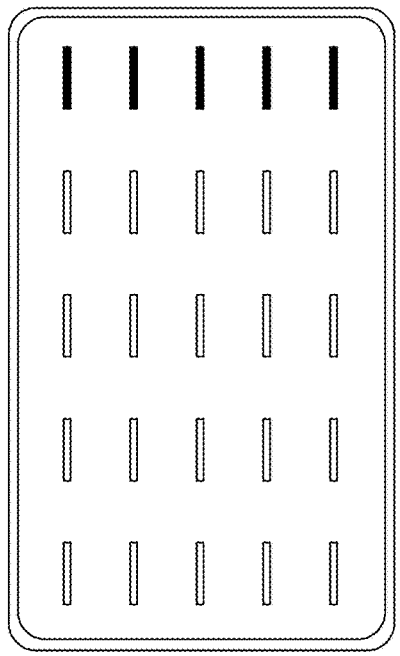
Figure 4D:
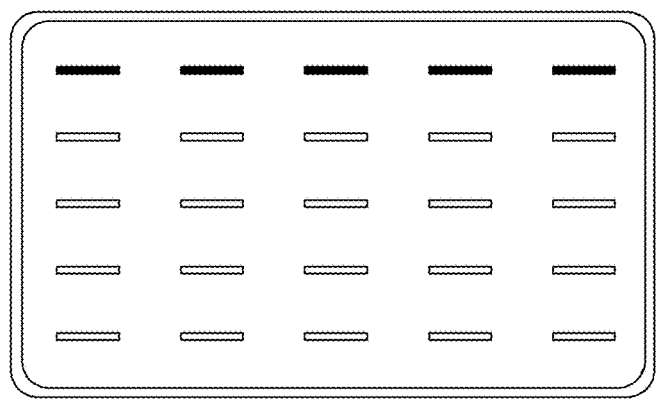

In the configuration of FIG. 4A, all of the antennas 130 of the array are activated. Such a configuration may be selected, e.g., when maximum throughput is desired. In the configuration of FIG. 4B, the activated antennas form a T shape. Such a configuration may be selected, for example, when the display is being used in a portrait mode with two hands contacting the display on the sides with the deactivated antennas. In the configuration of FIG. 4C, the top row of antennas are activated while all of the other antennas are deactivated. Such a configuration may be selected, for example, when a user is actively interacting with the display in order to reduce SAR. In the configuration of FIG. 4D, the top row is again activated while all of the other antennas are deactivated, but in this configuration the display 400 is placed in a landscape orientation. Again, such a configuration may be selected, for example, when a user is actively interacting with the display in a landscape mode in order to reduce SAR.

Figure 5:
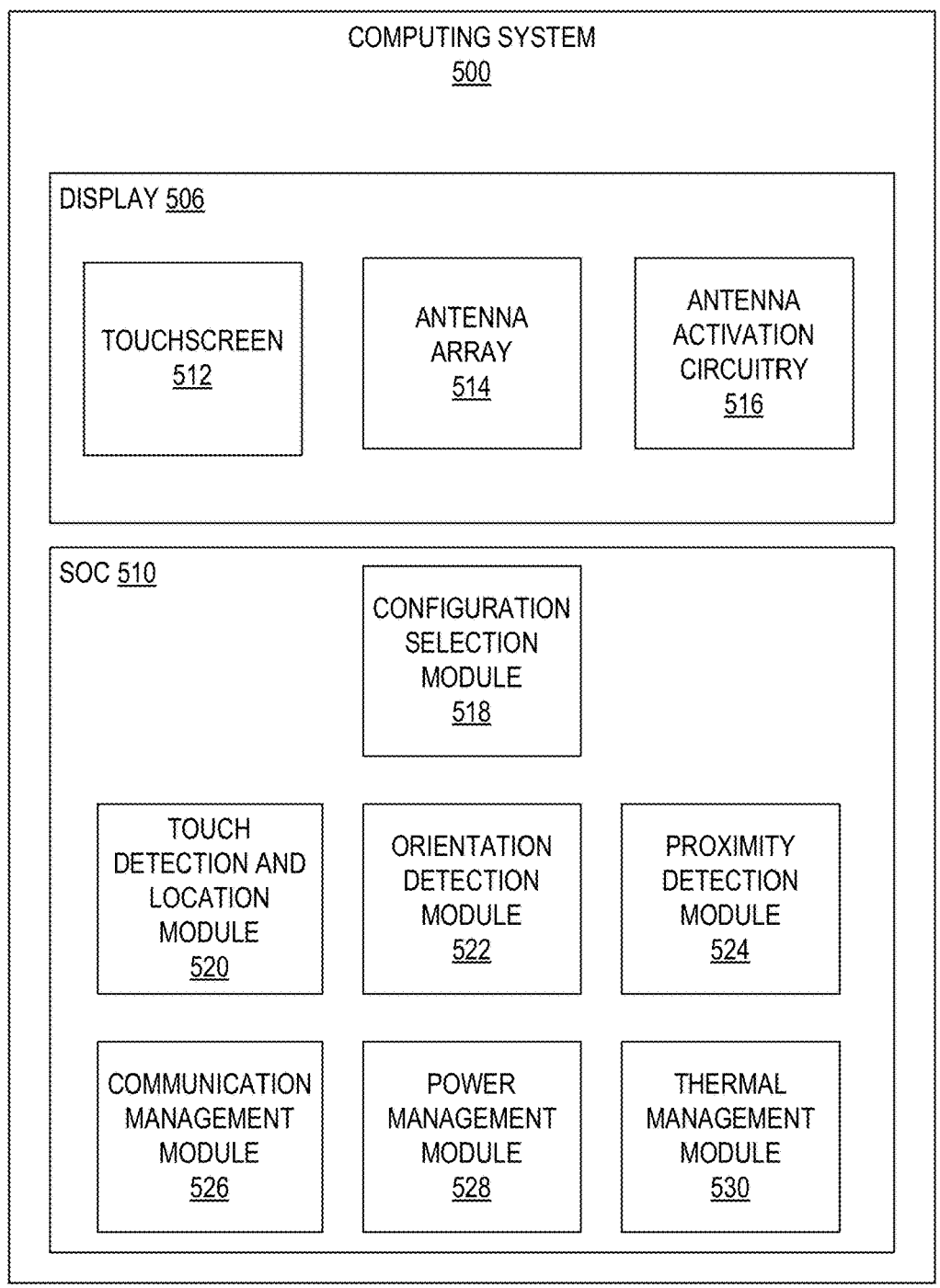
FIG. 5 illustrates a computing system to select an antenna array configuration in accordance with certain embodiments.

FIG. 5 illustrates a computing system 500 to select an antenna array configuration in accordance with certain embodiments. While a few examples of antenna array configurations and selection criteria are described above in connection with FIGS. 4A-4D, this disclosure contemplates any suitable configurations based on any suitable selection criteria.

Computing system 500 includes a display 506 (which may have any of the characteristics of display 100) and an SoC 510 comprising various modules. In the embodiment depicted, display 506 comprises a touchscreen 512, antenna array 514 (which may comprise a plurality of antennas 130), and antenna activation circuitry 516. The SoC 510 includes a configuration selection module 518 which may utilize information from various other modules to select an antenna configuration. For example, the modules supplying information for the antenna configuration selection may include touch detection and location module 520, orientation detection module 522, proximity detection module 524, communication management module 526, power management module 528, and thermal management module 530. In alternative embodiments, one or more of the modules 518 or sensors utilized by the modules 518 may be integrated within display 506 or located on another suitable device.

The touch detection and location module 520 may determine that the surface of the display has been touched and the location of the touch on the display. Module 520 may utilize data from touch sensors of touchscreen 512 in its determinations. The orientation detection module 522 may detect an orientation of the display 506 (e.g., portrait mode, landscape mode, or other orientation). Module 522 may utilize data from orientation sensors, such as one or more accelerometers. Proximity detection module 524 may detect a proximity of a user to the display 506. Module 524 may utilize data from one or more proximity sensors, such as an SAR sensor. Communication management module 526 may determine a strength of a signal (e.g., from a Wi-Fi access point). The power management module 528 may detect a battery level and/or determine an amount of power used by the display 506. The thermal management module 530 may determine whether a location, region, or the display 506 as a whole exhibit overheating. Any of the modules may include or be coupled to any suitable sensors to collect the data utilized by the module. In various embodiments, any one or more of these sensors may be located on the display substrate of display 506 or external to the display (e.g., on SoC 510).

Configuration selection module 518 may determine, based on any suitable information from the other modules, which configuration of a plurality of possible configurations should be selected for the antenna array 514. In some embodiments, the selection may be made from every possible antenna configuration by making a determination for each antenna of the array as to whether the antenna should be activated or deactivated. In other embodiments, the selection may be made from a limited number of available configurations (e.g., the four configurations depicted in FIGS. 4A-4B). The configuration selection module 518 may communicate the selected configuration to antenna activation circuitry 516 which may then activate the antennas specified by the configuration.

The antenna activation circuitry 516 may use any suitable circuitry to activate one or more particular antennas. For example, if a particular antenna is to be activated, switching circuitry coupling that antenna to other communication circuitry (e.g., radio circuitry 132) that may power the antenna is activated. In some embodiments, each antenna may be selectively activated independently of the other antennas (and thus the antenna activation circuitry 516 may be able to activate any permutation of the antennas of the array 514). In other embodiments, antennas may be configurable in sets, such that particular antennas must be activated or deactivated in a group. While this may sacrifice flexibility, it would decrease the amount of control circuitry.

Thus, the active antennas of the antenna array 514 may be configured in any suitable manner based on any suitable characteristic, such as one or a combination of channel traffic/bandwidth demand, wireless signal strength, channel availability access point location/proximity, human body presence detection, measurements from a SAR sensor, a usage mode of the display (e.g., tablet mode vs. laptop mode, portrait mode vs. landscape mode, etc.), detected touches (e.g., antennas proximate detected touchpoints may be turned off), detected interference from circuitry located on the display (changing location of active antennas may reduce the interference between circuitry elements of display 506), power consumption rate, battery charge level, thermal behavior of the display, or other suitable characteristic.

FIG. 5 illustrates one example of a set of modules that can be included in a computing system or device. In other embodiments, a computing system or device can have more or fewer modules than those shown in FIG. 5. Moreover, separate modules can be combined into a single module, and a single module can be split into multiple modules.

The computing system 500 can further comprise one or more computer-readable media that stores instructions to cause the modules of FIG. 5 to carry out their functionalities. These computer-readable media can be located in display 506 and/or external to the display 506 (e.g., in SoC 510). Any of the modules shown in FIG. 5 can be part of the operating system of the computing system 500, one or more software applications independent of the operating system, or operate at another software layer. The modules shown in FIG. 5 can be implemented in software, hardware, firmware or combinations thereof. A computer device or system referred to as being programmed to perform a method can be programmed to perform the method via software, hardware, firmware or combinations thereof.

Figure 6:
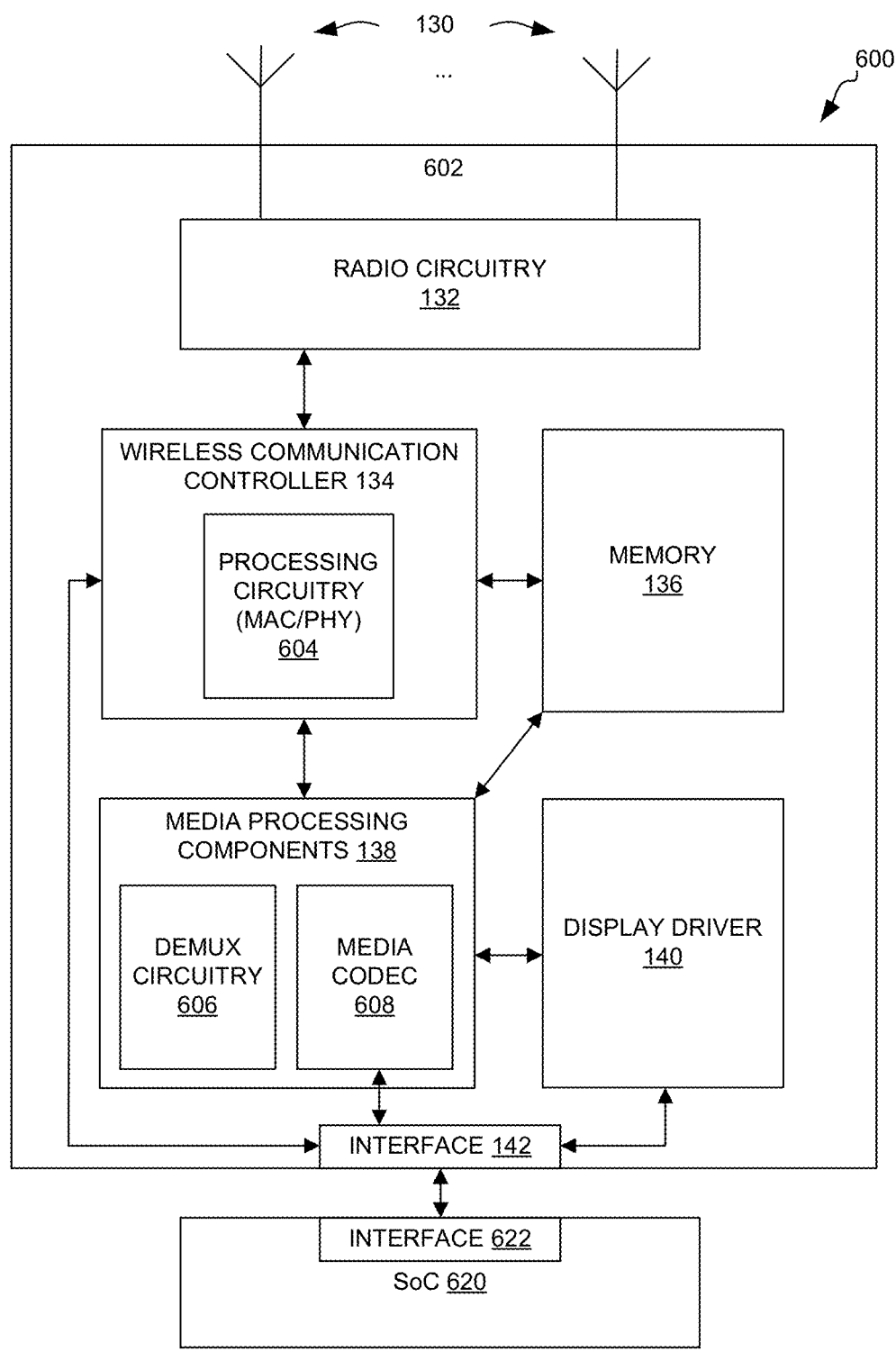
FIG. 6 illustrates a system comprising a display with an integrated wireless communication system in accordance with certain embodiments.

FIG. 6 illustrates a system 600 comprising a display 602 with an integrated wireless communication and media playback system in accordance with certain embodiments. The system 600 also includes an SoC 620 coupled to the display. Display 602 and SoC 620 may have any suitable characteristics of other displays or SoCs described herein.

Display 602 comprises radio circuitry 132, wireless communication controller 134, memory 136, media processing components 138, display driver 140, and interface 142. Integration of these components on the display 602 may enable offloading of media playback from the SoC 620 to the display 602.

The flow for media playback offload is as follows. The SoC 620 may start the application that requests a media stream (e.g., SoC 620 may execute the application using one or more processors). In an embodiment, SoC 620 may receive, via interface 622, an identifier of a media stream (e.g., in a header portion of the media stream) received wirelessly via antennas 130. Upon a determination that the media stream is a type of media that may be decoded by the display (e.g., by checking a type of the media stream against a list of media streams that may be decoded by the display), the SoC 620 may send a request to the display 602 to decode the media stream. The media stream is then decoded by the display and displayed without being sent to the SoC 620. In some embodiments, the SoC 620 may enter a low power state during the playback of the media stream, e.g., if the SoC 620 does not need to perform other processing concurrent with the playback. In other embodiments, wireless communication controller 134 may proactively identify an identifier of the media stream, initiate decoding of the media stream, and notify SoC 620 that the display is to decode the media stream.

The requested media stream is received via a wireless communication detected by the activated antennas 130. Radio circuitry 132 and wireless communication controller 134 process the received communication, which is then passed to the media processing components 138. In some embodiments, the SoC 620 may communicate with media processing components 138 to configure the media processing components 138 to demultiplex the audio and video from the media stream (e.g., by utilizing demux circuitry 606).

In one embodiment, the SoC 620 may decode the demultiplexed audio stream (e.g., by using a media codec matching the data type of the incoming audio stream). In another embodiment, the display 602 may decode the demultiplexed audio stream (e.g., by using a media codec 608 of the media processing components 138). The decoded audio data may then be routed based on the particular audio configuration (e.g., to a speaker integrated with display 602, to a Bluetooth speaker, to an audio jack connected to the housing, etc.). In some embodiments, the SoC 620 may configure the audio path so that the media codec 608 can route the audio data appropriately.

In some embodiments, the display 602 may utilize a media codec 608 to decode audio data and then periodically (e.g., every 1 second) send the audio data to the SoC 620. The SoC 620 may then use the decoded audio data (e.g., pulse-code modulated audio data) to drive an audio output. For example, the audio output could be located on a base of the display or at another location in the system.

The display 602 may also decode the demultiplexed video stream (e.g., by using a media codec 608 matching the data type of the incoming video stream). The demultiplexed video stream is then provided to display driver 140 which drives the display elements of the pixels of display 602 to effectuate media video playback. For example, the display driver 140 may drive an appropriate amount of current to electrodes of the display elements of the pixels to cause the media to be displayed by display 602.

As the media processing components 138 can perform video processing typically performed by processing resources external to the display in existing devices, the media processing components 138 allow for the offloading of video processing. Offloading video processing from processors external to the display can reduce the power consumption of the external processors, which can be of particular value if the external processor is in a mobile device operating on battery power. Moving video processing components from external processors to the display, where they are closer to the pixels, can also provide latency improvements. In various embodiments, the SoC 620 may comprise circuitry (e.g., one or more processors) that may be capable of performing the functions of video processing components 138, but such circuitry may go unused and/or be put into a low power mode (e.g., idle or sleep mode) while the display 602 executes the media playback functionality.

In various embodiments, the array of antennas 130 may also serve as the primary (and in some embodiments the sole) antenna system for the device 600. Accordingly, data received wirelessly via antennas 130 (e.g., non-media data, media data that can't be offloaded, or header portions of media data to be offloaded) may be processed by radio circuitry 132 and wireless communication controller 134 and passed through interface 142 to interface 622 of the SoC 620 for processing thereon. Accordingly, in some embodiments, a network stack may be implemented at both SoC 620 and by display 602 (e.g., by wireless communication controller 134). Similarly, data may be transmitted from the SoC 620 through the antennas 130 in reverse fashion.

The various components of display 602 will now be described in greater detail. A wireless communication system may include a wireless communication radio architecture in accordance with some demonstrative embodiments. The depicted radio architecture includes radio circuitry 132 and wireless communication controller 134.

The antennas 130 may include directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although certain shapes and spacing of antennas is depicted in various figures herein, any suitable shapes and spacing between antennas may be implemented in various embodiments. For example, in some embodiments (as shown in FIG. 1), the antennas may be repeated in a particular direction (e.g., horizontally, vertically, diagonally, etc.) with a particular pitch (distance from an edge of an antenna to the corresponding edge of an adjacent antenna). In particular embodiments, this pitch may be a multiple (e.g., 1×, 2×, 4×, 7×, 20×, etc.) of the pitch of adjacent pixels (e.g., pixel width 244 or 296). In other embodiments, the pitch between antennas may vary across the array. In some embodiments, the pitch may be common for some of the antennas and vary for other antennas. Although the antenna array is shown as a two-dimensional grid in the FIGs. herein, other embodiments may have an array having any suitable shape and/or density of antennas.

In FIG. 6, the representation of two antennas 130 may be interpreted to include any suitable number of antennas. Although FIG. 6 shows a single radio circuitry block 132 and a single wireless communication controller block 134; these blocks are to be viewed as representing the possibility of one or more circuitry blocks, where potentially one set of distinct circuitry blocks would work to provide the relevant functionalities noted herein. As used herein, "processing circuitry" or "processor" may include one or more distinctly identifiable processor blocks. As used herein, "processing" may entail processing fully or processing partially; and "decoding" may entail decoding fully or decoding partially.

Radio circuitry 132 may include a receive signal path comprising circuitry configured to operate on Radio Frequency (RF) signals received from one or more activated antennas 130, to amplify the received signals and to further process the amplified versions of the received signals. Radio circuitry 132 may also include a transmit signal path which may include circuitry configured to amplify signals for wireless transmission by one or more of the antennas 130. The receive signal path of the radio circuitry 132 may include a low-noise amplifier (LNA) to amplify received RF signals. The transmit signal path of the radio circuitry 132 may include a power amplifier (PA) to amplify signals, and one or more filters, such as band-pass filters (BPFs), low-pass filters (LPFs) or other types of filters, to generate signals for subsequent transmission (e.g., by one or more of the antennas 130).

In some dual-mode embodiments for Wi-Fi communication, the radio circuitry 132 may be configured to operate in either the 2.4 GHz frequency spectrum or the 5 GHz frequency spectrum. In these embodiments (or in other embodiments in which the radio circuitry 132 may operate in one or more other frequency spectrums), the receive signal path of the radio circuitry may include a receive signal path duplexer (or other circuitry) to separate the signals from each spectrum as well as provide a separate low noise amplifier (LNA) for each spectrum. In these embodiments, the transmit signal path of the FEM circuitry may also include a power amplifier and a filter, such as a BPF, a LPF or another type of filter for each frequency spectrum and a transmit signal path duplexer (or other circuitry) to provide the signals of one of the different spectrums onto a single transmit path for subsequent transmission by the one or more of the antennas 130. In some embodiments, Bluetooth (BT) communications may utilize the 2.4 GHZ signal paths and may utilize the same radio circuitry 132 as the one used for WLAN communications.

Radio circuitry 132 as shown may include a receive signal path and a transmit signal path. The receive signal path may include at least mixer circuitry, such as, for example, down-conversion mixer circuitry, amplifier circuitry and filter circuitry. The transmit signal path of the radio circuitry 132 may include at least filter circuitry and mixer circuitry, such as, for example, up-conversion mixer circuitry. Radio circuitry 132 may also include synthesizer circuitry for synthesizing a frequency for use by the mixer circuitries of the respective receive and transmit signal paths. The mixer circuitries of each of the receive and transmit signal paths may each, according to some embodiments, be configured to provide direct conversion functionality. The latter type of circuitry presents a much simpler architecture as compared with standard super-heterodyne mixer circuitries, and any flicker noise brought about by the same may be alleviated, for example, through the use of OFDM modulation. Each mixer circuitry may include one or more mixers, and filter circuitries may each include one or more filters, such as one or more BPFs and/or LPFs according to application needs. For example, when mixer circuitries are of the direct-conversion type, they may each include two or more mixers.

Wireless communication controller 134 may include processing circuitry 604 that provides Wi-Fi functionality or other wireless protocol functionality. In the instant description, the wireless communication controller 134 may interface with memory 136, which may include for example, a set of RAM arrays in a Fast Fourier Transform or Inverse Fast Fourier Transform block (not shown) from and into which the processing circuitry 604 may read and write data, such as, for example, data relating to butterfly operations. Memory 136 may further store control logic. Processing circuitry 604 may implement control logic within the memory to process the signals received from the receive signal path of the radio circuitry 132. Wireless communication controller 134 is additionally configured to also generate corresponding baseband signals for the transmit signal path of the radio circuitry 132 and may further include physical layer (PHY) and medium access control layer (MAC) circuitry and may further interface with an application processor (e.g., on SoC 620 or other processor) for generation and processing of the baseband signals and for controlling operations of the radio circuitry 132.

In some other embodiments, the radio architecture may be configured to transmit and receive signals transmitted using one or more modulation techniques such as OFDM or OFDMA or other modulation techniques, such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, and On-Off Keying (OOK), although the scope of the embodiments is not limited in this respect.

In some demonstrative embodiments, the radio-architecture may be configured for cellular communication (e.g., 3GPP such as LTE, LTE-Advanced, or 5G communications). In some IEEE 802.11 embodiments, the radio architecture may be configured for communication over various channel bandwidths including bandwidths having center frequencies of 900 MHz, 2.4 GHz, 5 GHz, and bandwidths of less than 5 MHz, or of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths), or any combination of the above frequencies or bandwidths, or any frequencies or bandwidths between the ones expressly noted above. In some demonstrative embodiments, a 320 MHz channel bandwidth may be used. In a further embodiment, the radio architecture may be configured to operate on center frequencies above 45 GHz. The scope of the embodiments is not limited with respect to the above frequencies however. For example, the radio architecture may be configured to operate on center frequencies at or near 6 GHz.

In some demonstrative embodiments, SoC 620 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. SoC 620 may execute instructions, for example, of an Operating System (OS) and/or of one or more suitable applications.

In some demonstrative embodiments, memory 136 may include, for example, a Random-Access Memory (RAM), a Read-Only Memory (ROM), a Dynamic RAM (DRAM), a Synchronous DRAM (SD-RAM), a flash memory, a volatile memory, a non-volatile memory, a cache memory, a buffer, a short-term memory unit, a long-term memory unit, or other suitable memory units. Memory 136 may be used by wireless communication controller 134 and/or video processing components 138 (or other components) to store data during operation.

Media processing components 138 may include demultiplexer circuitry 606 and any suitable number of media codecs 608. A media codec 608 may be operable to decompress a certain type of media file, such as a video or an audio file. In various embodiments, the SoC 620 may load firmware into memory 136 of the display that may be executed to implement one or more media codecs 608 at any suitable time (e.g., prior to starting the application requesting the media playback). In other embodiments, the media codec 608 may be implemented in hardware on the display.

Display driver 140 may comprise circuitry to receive a decoded video file and to drive electrical signals to the display elements to cause the display 602 to display the video. In a particular embodiment, display driver may comprise a timing controller (TCON) embedded driver (TED). In a particular embodiment, display driver 140 comprises one or more row and column drivers. The display driver 140 may include one or more digital to analog converters (DACs) to produce the appropriate currents to drive the pixels.

Figure 7:
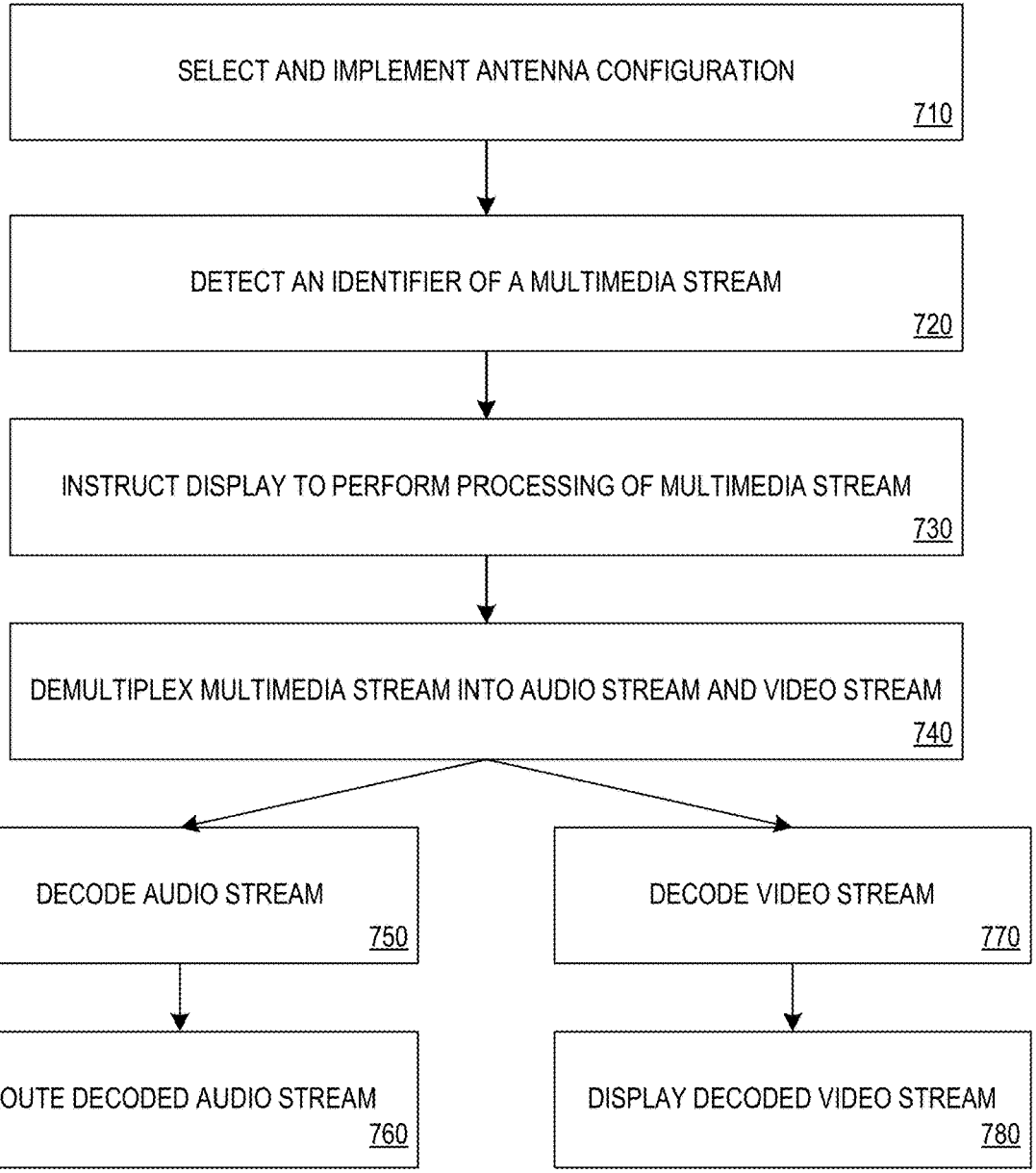
FIG. 7 illustrates a flow for offloading processing of a video stream to a display in accordance with certain embodiments.

FIG. 7 illustrates a flow 700 for offloading processing of a video stream to a display (e.g., 602) in accordance with certain embodiments. At 710, an antenna configuration is selected and implemented. The antenna configuration may specify which antennas of an antenna array are to be activated and which (if any) are to be deactivated and may be based off of sensor data measuring operational characteristics of the display 602 or system comprising the display.

At 720, an identifier of a multimedia stream is detected (e.g., by SoC 620 or display 602). For example, the identifier may be located in a header of the multimedia stream or other data that is associated with the multimedia stream.

At 730, the display is instructed to perform processing of the multimedia stream. In one embodiment, the SoC 620 may instruct the display to perform such processing. In another embodiment, a component of the display 602 may determine that the display 602 is to process the multimedia stream rather than communicate the multimedia stream to the SoC 620 for processing.

At 740, the multimedia stream is demultiplexed by the display 602 into an audio stream and a video stream. At 750 the audio stream is decoded and at 770 the video stream is decoded. In some embodiments, these operations may occur, at least in part, in parallel. In one embodiment, the display 602 may perform each of these operations. In another embodiment, the display 602 may perform the video stream decoding and send the audio stream to another device (e.g., SoC 620) for decoding thereon. At 760, the decoded audio stream is routed (e.g., to a speaker). At 780, the decoded video stream is displayed by the display 602.

The flow described in FIG. 7 is merely representative of operations or communications that may occur in particular embodiments. In other embodiments, additional operations or communications may be performed in the flow. Various embodiments of the present disclosure contemplate any suitable signaling mechanisms for accomplishing the functions described herein. Some of the operations illustrated in FIG. 7 may be repeated, combined, modified, or deleted where appropriate. Additionally, operations may be performed in any suitable order without departing from the scope of particular embodiments.

Figure 8:
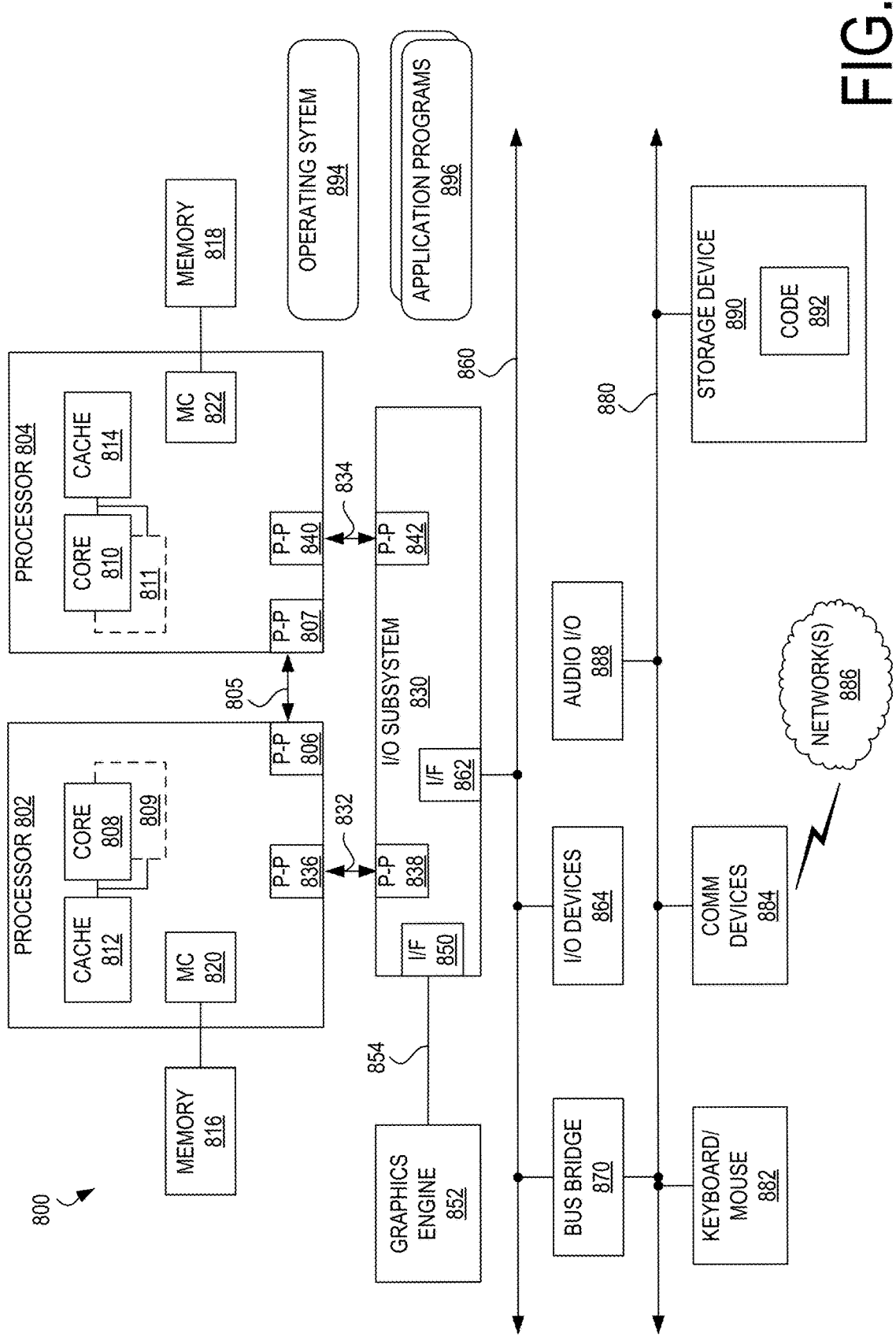
FIG. 8 is a block diagram of a computing device in which technologies described herein may be implemented in accordance with certain embodiments.

FIG. 8 is a block diagram of a computing device in which technologies described herein may be implemented in accordance with certain embodiments. The technologies, techniques, and embodiments described herein can be performed by any of a variety of computing devices, including mobile devices (e.g., smartphones, handheld computers, laptops, notebooks, tablets, media players, portable gaming consoles, cameras), non-mobile devices (e.g., desktop computers, servers, stationary gaming consoles, set-top boxes, televisions) and embedded devices (e.g., devices incorporated into a vehicle, home or place of business). As used herein, the term "computing devices" includes computing systems and includes devices comprising multiple discrete physical components.

FIG. 8 is a block diagram of an exemplary computing device in which technologies described herein may be implemented. Generally, components shown in FIG. 8 can communicate with other shown components, although not all connections are shown, for ease of illustration. The device 800 is a multiprocessor system comprising a first processor 802 and a second processor 804 and is illustrated as comprising point-to-point (P-P) interconnects. For example, a point-to-point (P-P) interface 806 of the processor 802 is coupled to a point-to-point interface 807 of the processor 804 via a point-to-point interconnection 805. It is to be understood that any or all of the point-to-point interconnects illustrated in FIG. 8 can be alternatively implemented as a multi-drop bus, and that any or all buses illustrated in FIG. 8 could be replaced by point-to-point interconnects.

As shown in FIG. 8, the processors 802 and 804 are multicore processors. Processor 802 comprises processor cores 808 and 809, and processor 804 comprises processor cores 810 and 811. Processor cores 808-811 can execute computer-executable instructions in a manner similar to that discussed below in connection with FIG. 9, or in other manners.

Processors 802 and 804 further comprise at least one shared cache memory 812 and 814, respectively. The shared caches 812 and 814 can store data (e.g., instructions) utilized by one or more components of the processor, such as the processor cores 808-809 and 810-811. The shared caches 812 and 814 can be part of a memory hierarchy for the device 800. For example, the shared cache 812 can locally store data that is also stored in a memory 816 to allow for faster access to the data by components of the processor 802. In some embodiments, the shared caches 812 and 814 can comprise multiple cache layers, such as level 1 (L1), level 2 (L2), level 3 (L3), level 4 (L4), and/or other caches or cache layers, such as a last level cache (LLC).

Although the device 800 is shown with two processors, the device 800 can comprise any number of processors. Further, a processor can comprise any number of processor cores. A processor can take various forms such as a central processing unit, a controller, a graphics processor, an accelerator (such as a graphics accelerator or digital signal processor (DSP)) or a field programmable gate array (FPGA). A processor in a device can be the same as or different from other processors in the device. In some embodiments, the device 800 can comprise one or more processors that are heterogeneous or asymmetric to a first processor, accelerator, FPGA, or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 802 and 804 reside in the same die package.

Processors 802 and 804 further comprise memory controller logic (MC) 820 and 822. As shown in FIG. 8, MCs 820 and 822 control memories 816 and 818 coupled to the processors 802 and 804, respectively. The memories 816 and 818 can comprise various types of memories, such as volatile memory (e.g., dynamic random access memories (DRAM), static random access memory (SRAM)) or non-volatile memory (e.g., flash memory). While MCs 820 and 822 are illustrated as being integrated into the processors 802 and 804, in alternative embodiments, the MCs can be logic external to a processor and can comprise one or more layers of a memory hierarchy.

Processors 802 and 804 are coupled to an Input/Output (I/O) subsystem 830 via P-P interconnections 832 and 834. The point-to-point interconnection 832 connects a point-to-point interface 836 of the processor 802 with a point-to-point interface 838 of the I/O subsystem 830, and the point-to-point interconnection 834 connects a point-to-point interface 840 of the processor 804 with a point-to-point interface 842 of the I/O subsystem 830. Input/Output subsystem 830 further includes an interface 850 to couple I/O subsystem 830 to a graphics engine 852, which can be a high-performance graphics engine. The I/O subsystem 830 and the graphics engine 852 are coupled via a bus 854. Alternately, the bus 854 could be a point-to-point interconnection.

Input/Output subsystem 830 is further coupled to a first bus 860 via an interface 862. The first bus 860 can be a Peripheral Component Interconnect (PCI) bus, a PCI Express bus, another third generation I/O interconnection bus or any other type of bus.

Various I/O devices 864 can be coupled to the first bus 860. A bus bridge 870 can couple the first bus 860 to a second bus 880. In some embodiments, the second bus 880 can be a low pin count (LPC) bus. Various devices can be coupled to the second bus 880 including, for example, a keyboard/mouse 882, audio I/O devices 888 and a storage device 890, such as a hard disk drive, solid-state drive or other storage devices for storing computer-executable instructions (code) 892. The code 892 can comprise computer-executable instructions for performing technologies described herein. Additional components that can be coupled to the second bus 880 include communication device(s) 884, which can provide for communication between the device 800 and one or more wired or wireless networks 886 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

The device 800 can comprise removable memory such as flash memory cards (e.g., SD (Secure Digital) cards), memory sticks, Subscriber Identity Module (SIM) cards). The memory in device 800 (including caches 812 and 814, memories 816 and 818 and storage device 890) can store data and/or computer-executable instructions for executing an operating system 894 and application programs 896. Example data includes web pages, text messages, images, sound files, video data, biometric thresholds for particular users or other data sets to be sent to and/or received from one or more network servers or other devices by the device 800 via one or more wired or wireless networks, or for use by the device 800. The device 800 can also have access to external memory (not shown) such as external hard drives or cloud-based storage.

The operating system 894 can control the allocation and usage of the components illustrated in FIG. 8 and support one or more application programs 896. The application programs 896 can include common mobile computing device applications (e.g., email applications, calendars, contact managers, web browsers, messaging applications) as well as other computing applications and utilities, such as a virtual keyboard.

The device 800 can support various input devices, such as a touchscreen, microphones, camera, physical keyboard, virtual keyboard, proximity sensor and trackball, and one or more output devices, such as a speaker and a display. Other possible input and output devices include piezoelectric and other haptic I/O devices. Any of the input or output devices can be internal to, external to or removably attachable with the device 800. External input and output devices can communicate with the device 800 via wired or wireless connections.

In addition, the computing device 800 can provide one or more natural user interfaces (NUIs). For example, the operating system 894 or applications 896 can comprise speech recognition logic as part of a voice user interface that allows a user to operate the device 800 via voice commands. Further, the device 800 can comprise input devices and logic that allows a user to interact with the device 800 via a body, hand or face gestures. For example, a user's hand gestures can be detected and interpreted to provide input to a gaming application.

The device 800 can further comprise one or more communication components 884. The components 884 can comprise wireless communication components coupled to one or more antennas to support communication between the system 800 and external devices. The wireless communication components can support various wireless communication protocols and technologies such as Near Field Communication (NFC), Wi-Fi, Bluetooth, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device 800 can further include at least one input/output port (which can be, for example, a USB, IEEE 1394 (FireWire), Ethernet and/or RS-232 port) comprising physical connectors; a power supply; a satellite navigation system receiver, such as a GPS receiver; a gyroscope; an accelerometer; a proximity sensor; and a compass. A GPS receiver can be coupled to a GPS antenna. The device 800 can further include one or more additional antennas coupled to one or more additional receivers, transmitters and/or transceivers to enable additional functions.

It is to be understood that FIG. 8 illustrates only one exemplary computing device architecture. Computing devices based on alternative architectures can be used to implement technologies described herein. For example, instead of the processors 802 and 804, and the graphics engine 852 being located on discrete integrated circuits, a computing device can comprise an SoC (system-on-a-chip) integrated circuit incorporating multiple processors, a graphics engine and additional components. Further, a computing device can connect elements via bus or point-to-point configurations different from that shown in FIG. 8. Moreover, the illustrated components in FIG. 8 are not required or all-inclusive, as shown components can be removed and other components added in alternative embodiments.

Figure 9:
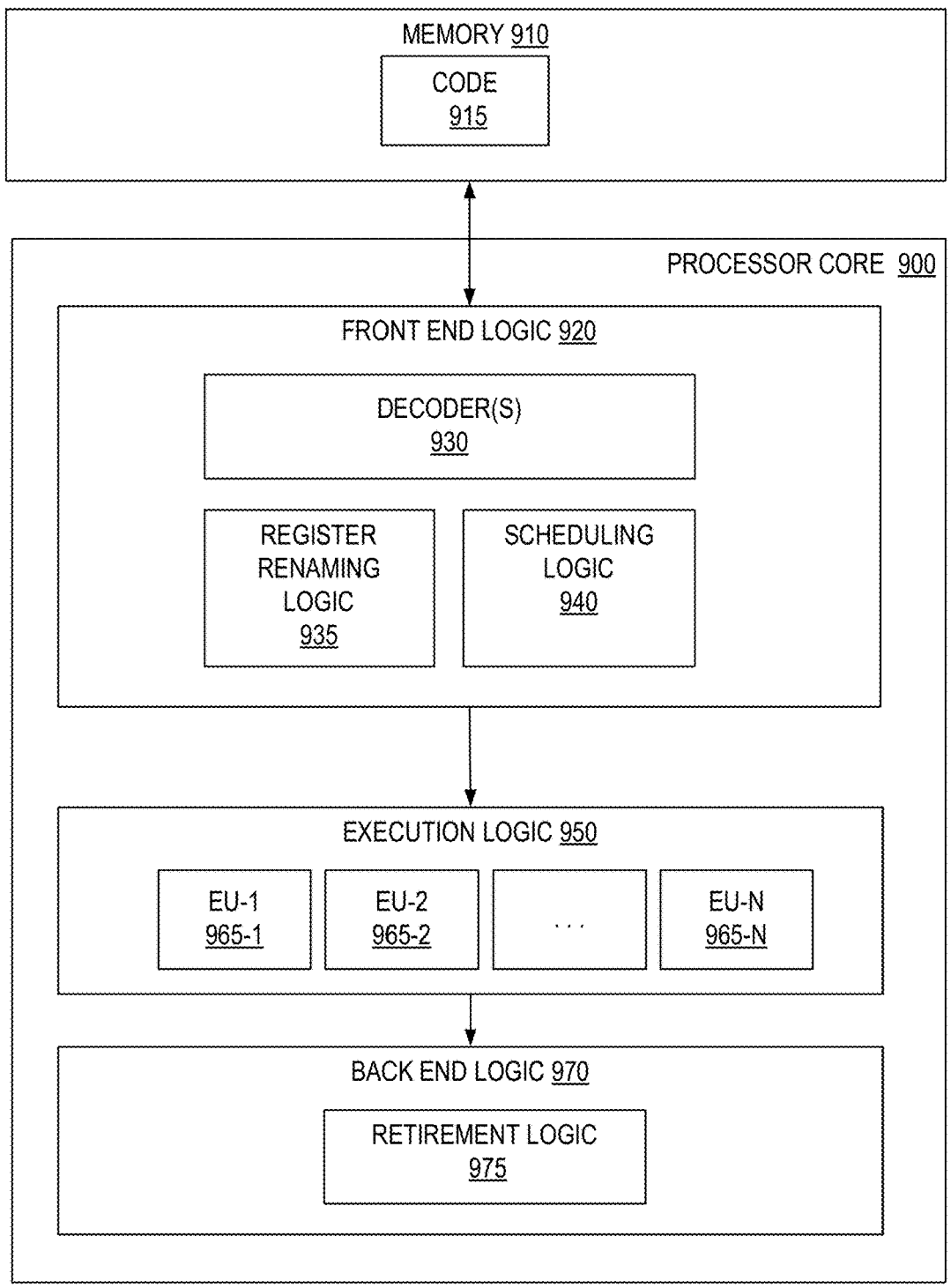
FIG. 9 is a block diagram of an exemplary processor core that can execute instructions as part of implementing technologies described herein in accordance with certain embodiments.

FIG. 9 is a block diagram of an exemplary processor core that can execute instructions as part of implementing technologies described herein in accordance with certain embodiments. The processor core 900 can be a core for any type of processor, such as a microprocessor, an embedded processor, a digital signal processor (DSP) or a network processor. The processor core 900 can be a single-threaded core or a multithreaded core in that it may include more than one hardware thread context (or "logical processor") per core.

FIG. 9 also illustrates a memory 910 coupled to the processor 900. The memory 910 can be any memory described herein or any other memory known to those of skill in the art. The memory 910 can store computer-executable instruction 915 (code) executable by the processor core 900.

The processor core comprises front-end logic 920 that receives instructions from the memory 910. An instruction can be processed by one or more decoders 930. The decoder 930 can generate as its output a micro operation such as a fixed width micro operation in a predefined format, or generate other instructions, micro-instructions, or control signals, which reflect the original code instruction. The front-end logic 920 further comprises register renaming logic 935 and scheduling logic 940, which generally allocate resources and queues operations corresponding to converting an instruction for execution.

The processor core 900 further comprises execution logic 950, which comprises one or more execution units (EUs) 965-1 through 965-N. Some processor core embodiments can include a number of execution units dedicated to specific functions or sets of functions. Other embodiments can include only one execution unit or one execution unit that can perform a particular function. The execution logic 950 performs the operations specified by code instructions. After completion of execution of the operations specified by the code instructions, back-end logic 970 retires instructions using retirement logic 975. In some embodiments, the processor core 900 allows out of order execution but requires in-order retirement of instructions. Retirement logic 970 can take a variety of forms as known to those of skill in the art (e.g., re-order buffers or the like).

The processor core 900 is transformed during execution of instructions, at least in terms of the output generated by the decoder 930, hardware registers and tables utilized by the register renaming logic 935, and any registers (not shown) modified by the execution logic 950. Although not illustrated in FIG. 9, a processor can include other elements on an integrated chip with the processor core 900. For example, a processor may include additional elements such as memory control logic, one or more graphics engines, I/O control logic and/or one or more caches.

As used in any embodiment herein, the term "module" refers to logic that may be implemented in a hardware component or device (e.g., via circuitry), software or firmware running on a processor, or a combination thereof, to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hardwired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry, such as continuous itemset generation circuitry, entropy-based discretization circuitry, etc. A computer device referred to as being programmed to perform a method can be programmed to perform the method via software, hardware, firmware or combinations thereof.

Any of the disclosed methods can be implemented as computer-executable instructions or a computer program product. Such instructions can cause a computer or one or more processors capable of executing computer-executable instructions to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer programs, as well as any data created and used during implementation of the disclosed technologies, can be stored on one or more tangible or non-transitory computer-readable storage media, such as optical media discs (e.g., DVDs, CDs), volatile memory components (e.g., DRAM, SRAM), or non-volatile memory components (e.g., flash memory, solid state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be read and executed by, for example, a single computing device or in a network environment using one or more networked computers. Further, it is to be understood that the disclosed technology is not limited to any specific computer language or program. For instance, the disclosed technologies can be implemented by software written in C++, Java, Perl, JavaScript, Adobe Flash, or any other suitable programming language. Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed in a variety of manners. For example, such instructions can be uploaded, downloaded or remotely accessed using the Internet, the World Wide Web, an intranet, cable (including fiber optic cable), magnetic communications, electromagnetic communications (including RF, microwave, and infrared communications), and electronic communications.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrase "at least one of A, B or C" can mean A; B; C; A and B; A and C; B and C; or A, B, and C.

The disclosed methods, apparatuses and systems are not to be construed as limiting in any way. Instead, the present disclosure is directed toward all novel and non-obvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 may comprise a display comprising a display substrate comprising a front side; a plurality of pixels located on the front side of the display substrate, the plurality of pixels defining a display area; and an antenna array comprising a plurality of antennas located on the front side of the display substrate and within the display area.

Example 2 may comprise the subject matter of example 1, wherein at least a portion of an antenna of the plurality of antennas is located between a plurality of display elements of a first pixel and a plurality of display elements of a second pixel, wherein the first pixel is directly adjacent to the second pixel.

Example 3 may comprise the subject matter of any of examples 1-2, wherein adjacent antennas of a first set of three or more antennas of the plurality of antennas are separated by a common pitch in a particular direction.

Example 4 may comprise the subject matter of any of examples 1-3, wherein the common pitch is a multiple of a pitch length between directly adjacent pixels of the plurality of pixels.

Example 5 may comprise the subject matter of any of examples 1-4, the display further comprising circuitry to selectively activate a subset of the plurality of antennas based on a selected antenna configuration.

Example 6 may comprise the subject matter of any of examples 1-5, wherein the selected antenna configuration is based on a plurality of detected touches of the display.

Example 7 may comprise the subject matter of any of examples 1-6, wherein the selected antenna configuration is based on an orientation of the display.

Example 8 may comprise the subject matter of any of examples 1-7, wherein the selected antenna configuration is based on one or more of a battery charge level and a thermal condition.

Example 9 may comprise the subject matter of any of examples 1-8, wherein the selected antenna configuration is based on data sensed by one or more specific absorption rate sensors of the display.

Example 10 may comprise the subject matter of any of examples 1-9, wherein the display further comprises one or more media processing components on the display substrate and within the display area, the one or more media processing components to decode a video stream received wirelessly via the antenna array and to provide the decoded video stream to a display driver for display within the display area.

Example 11 may comprise the subject matter of example 10, wherein the one or more media processing components within the display area are to demultiplex an audio stream and the video stream from a multimedia stream comprising the video stream prior to decoding the video stream.

Example 12 may comprise the subject matter of any of examples 1-11, wherein the display is to comprise an interface to communicate data received wirelessly via the antenna to a processor coupled to the display, and wherein the processor is to request offloading to the display of playback of video data received wirelessly via the antenna such that the processor does not process the video data received wirelessly via the antenna.

Example 13 may comprise a method comprising receiving a wireless communication via an antenna array comprising a plurality of antennas located on a front side of a display substrate and within a display area, wherein the display area is defined by a plurality of pixels located on the front side of the display substrate.

Example 14 may comprise the subject matter of example 13, wherein at least a portion of an antenna of the plurality of antennas is located between a plurality of display elements of a first pixel and a plurality of display elements of a second pixel, wherein the first pixel is directly adjacent to the second pixel.

Example 15 may comprise the subject matter of any of examples 13-14, wherein adjacent antennas of a first set of three or more antennas of the plurality of antennas are separated by a common pitch in a particular direction.

Example 16 may comprise the subject matter of any of examples 13-15, wherein the common pitch is a multiple of a pitch length between directly adjacent pixels of the plurality of pixels.

Example 17 may comprise the subject matter of any of examples 13-16, further comprising activating a subset of the plurality of antennas and deactivating the remainder of the plurality of antennas based on a selected antenna configuration.

Example 18 may comprise the subject matter of any of examples 13-17, wherein the selected antenna configuration is based on a plurality of detected touches of the display.

Example 19 may comprise the subject matter of any of examples 13-18, wherein the selected antenna configuration is based on an orientation of the display.

Example 20 may comprise the subject matter of any of examples 13-19, wherein the selected antenna configuration is based on one or more of a battery charge level and a thermal condition.

Example 21 may comprise the subject matter of any of examples 13-20, wherein the selected antenna configuration is based on data sensed by one or more specific absorption rate sensors of the display.

Example 22 may comprise the subject matter of any of examples 13-21, further comprising decoding, by one or more media processing components located on the display substrate and within the display area, a video stream received wirelessly via the antenna array; and providing the decoded video stream to a display driver for display within the display area.

Example 23 may comprise the subject matter of example 22, further comprising demultiplexing, by the one or more media processing components located on the display substrate, an audio stream and the video stream from a multimedia stream comprising the video stream prior to decoding the video stream.

Example 24 may comprise the subject matter of any of examples 13-23, wherein the display is to comprise an interface to communicate data received wirelessly via the antenna to a processor coupled to the display, and wherein the processor is to request offloading to the display of playback of video data received wirelessly via the antenna such that the processor does not process the video data received wirelessly via the antenna.

Example 25 may comprise a system comprising a display comprising a display substrate comprising a front side; a plurality of pixels located on the front side of the display substrate, the plurality of pixels defining a display area; and an antenna array comprising a plurality of antennas located on the front side of the display substrate and within the display area; and a processor to communicatively couple to the display.

Example 26 may comprise the subject matter of example 25, wherein at least a portion of an antenna of the plurality of antennas is located between a plurality of display elements of a first pixel and a plurality of display elements of a second pixel, wherein the first pixel is directly adjacent to the second pixel.

Example 27 may comprise the subject matter of any of examples 25-26, wherein adjacent antennas of a first set of three or more antennas of the plurality of antennas are separated by a common pitch in a particular direction.

Example 28 may comprise the subject matter of any of examples 25-27, wherein the common pitch is a multiple of a pitch length between directly adjacent pixels of the plurality of pixels.

Example 29 may comprise the subject matter of any of examples 25-28, the display further comprising circuitry to selectively activate a subset of the plurality of antennas based on a selected antenna configuration.

Example 30 may comprise the subject matter of any of examples 25-29, wherein the selected antenna configuration is based on a plurality of detected touches of the display.

Example 31 may comprise the subject matter of any of examples 25-30, wherein the selected antenna configuration is based on an orientation of the display.

Example 32 may comprise the subject matter of any of examples 25-31, wherein the selected antenna configuration is based on one or more of a battery charge level and a thermal condition.

Example 33 may comprise the subject matter of any of examples 25-32, wherein the selected antenna configuration is based on data sensed by one or more specific absorption rate sensors of the display.

Example 34 may comprise the subject matter of any of examples 25-33, wherein the display further comprises one or more media processing components on the display substrate and within the display area, the one or more media processing components to decode a video stream received wirelessly via the antenna array and to provide the decoded video stream to a display driver for display within the display area.

Example 35 may comprise the subject matter of example 34, wherein the one or more media processing components within the display area are to demultiplex an audio stream and the video stream from a multimedia stream comprising the video stream prior to decoding the video stream.

Example 36 may comprise the subject matter of any of examples 25-35, wherein the display is to comprise an interface to communicate data received wirelessly via the antenna to a processor coupled to the display, and wherein the processor is to request offloading to the display of playback of video data received wirelessly via the antenna such that the processor does not process the video data received wirelessly via the antenna.

Example 37 may comprise the subject matter of any of examples 25-36, detect an identifier of a multimedia stream to be communicated over the antenna array; and responsive to the detection of the identifier, instruct the display to decode the multimedia stream at the display.

Example 38 may comprise the subject matter of any of examples 25-37, wherein the processor is to determine an antenna configuration based on sensor data from one or more sensors, the antenna configuration specifying activation of a subset of the plurality of antennas and deactivation of the remainder of the plurality of antennas; and communicate the antenna configuration to the display.

We claim:

1. A display comprising:
   a display substrate comprising a front side;
   a plurality of pixels located on the front side of the display substrate, the plurality of pixels defining a display area;
   an antenna array comprising a plurality of antennas located on the front side of the display substrate and within the display area; and
   circuitry to process a communication received via the antenna array, wherein the circuitry is located on the front side of the display substrate and within the display area.

2. The display of claim 1, wherein at least a portion of an antenna of the plurality of antennas is located between a plurality of display elements of a first pixel and a plurality of display elements of a second pixel, wherein the first pixel is directly adjacent to the second pixel.

3. The display of claim 1, wherein adjacent antennas of a first set of three or more antennas of the plurality of antennas are separated by a common pitch in a particular direction.

4. The display of claim 3, wherein the common pitch is a multiple of a pitch length between directly adjacent pixels of the plurality of pixels.

5. The display of claim 1, the display further comprising circuitry to selectively activate a subset of the plurality of antennas based on a selected antenna configuration.

6. The display of claim 5, wherein the selected antenna configuration is based on a plurality of detected touches of the display.

7. The display of claim 5, wherein the selected antenna configuration is based on an orientation of the display.

8. The display of claim 5, wherein the selected antenna configuration is based on one or more of a battery charge level and a thermal condition.

9. The display of claim 5, wherein the selected antenna configuration is based on data sensed by one or more specific absorption rate sensors of the display.

10. The display of claim 1 wherein the display further comprises one or more media processing components on the display substrate and within the display area, the one or more media processing components to decode a video stream received wirelessly via the antenna array and to provide the decoded video stream to a display driver for display within the display area.

11. The display of claim 10, wherein the one or more media processing components within the display area are to demultiplex an audio stream and the video stream from a multimedia stream comprising the video stream prior to decoding the video stream.

12. The display of claim 1, wherein the display is to comprise an interface to communicate data received wirelessly via the antenna to a processor coupled to the display, and wherein the processor is to request offloading to the display of playback of video data received wirelessly via the antenna such that the processor does not process the video data received wirelessly via the antenna.

13. A method comprising:
   receiving a wireless communication via an antenna array comprising a plurality of antennas located on a front side of a display substrate and within a display area, wherein the display area is defined by a plurality of pixels located on the front side of the display substrate; and
   processing, via circuitry located on the front side of the display substrate and within the display area, a communication received via the antenna array.

14. The method of claim 13, further comprising activating a subset of the plurality of antennas and deactivating any antennas of the plurality of antennas that are not in the subset based on a selected antenna configuration.

15. The method of claim 13, further comprising:
   decoding, by one or more media processing components located on the display substrate and within the display area, a video stream received wirelessly via the antenna array; and
   providing the decoded video stream to a display driver for display within the display area.

16. The method of claim 15, further comprising demultiplexing, by the one or more media processing components located on the display substrate, an audio stream and the video stream from a multimedia stream comprising the video stream prior to decoding the video stream.

17. A system comprising:
a display comprising:
- a display substrate comprising a front side;
- a plurality of pixels located on the front side of the display substrate, the plurality of pixels defining a display area;
- an antenna array comprising a plurality of antennas located on the front side of the display substrate and within the display area; and
- circuitry to process a communication received via the antenna array, wherein the circuitry is located on the front side of the display substrate and within the display area; and a processor to communicatively couple to the display.

18. The system of claim 17, wherein the processor is to:
detect an identifier of a multimedia stream to be communicated over the antenna array; and
responsive to the detection of the identifier, instruct the display to decode the multimedia stream at the display.

19. The system of claim 18, the display further comprising one or more media processing components located on the display substrate and within the display area, the one or more media processing components to decode a video stream of the multimedia.

20. The system of claim 17, wherein the processor is to:
determine an antenna configuration based on sensor data from one or more sensors, the antenna configuration specifying activation of a subset of the plurality of antennas and deactivation of any antennas of the plurality of antennas that are not in the subset; and
communicate the antenna configuration to the display.

\* \* \* \* \*